US011215312B2

(12) United States Patent
Lange et al.

(10) Patent No.: US 11,215,312 B2
(45) Date of Patent: Jan. 4, 2022

(54) MECHANICAL HARD STOPS WITH MOVEABLE STOP MEMBERS

(71) Applicant: Goodrich Corporation, Charlotte, NC (US)

(72) Inventors: Davis A. Lange, Sturbridge, MA (US); Luke N. Asselin, Amesbury, MA (US); Christopher William Helmke, Bedford, NH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 16/584,403

(22) Filed: Sep. 26, 2019

(65) Prior Publication Data

US 2020/0096151 A1  Mar. 26, 2020

Related U.S. Application Data

(60) Provisional application No. 62/736,947, filed on Sep. 26, 2018.

(51) Int. Cl.
*F16M 11/04* (2006.01)
*G02B 23/16* (2006.01)
*G03B 17/56* (2021.01)
*B64D 47/08* (2006.01)
*G03B 15/00* (2021.01)

(52) U.S. Cl.
CPC .............. *F16M 11/04* (2013.01); *G02B 23/16* (2013.01); *G03B 17/561* (2013.01); *B64D 47/08* (2013.01); *F16M 2200/021* (2013.01); *G03B 15/006* (2013.01)

(58) Field of Classification Search
CPC ...... G02B 23/16; G03B 17/561; G03B 15/006; B64D 47/08; F16M 2200/021
USPC ....................................... 248/186.2
See application file for complete search history.

(56) References Cited

U.S. PATENT DOCUMENTS

| 2,747,413 | A | * | 5/1956 | Hurlburt | G01C 19/26 74/5.2 |
| 5,907,433 | A | | 5/1999 | Voigt et al. | |
| 2007/0154765 | A1 | * | 7/2007 | Bayer | H01M 8/247 429/506 |
| 2015/0204413 | A1 | * | 7/2015 | Churchill | F16F 13/28 248/550 |
| 2016/0270874 | A1 | * | 9/2016 | Sporer | A61B 90/25 |
| 2017/0081050 | A1 | | 3/2017 | Gans et al. | |
| 2018/0113462 | A1 | | 4/2018 | Fenn et al. | |

(Continued)

OTHER PUBLICATIONS

Extended European search report issued in corresponding EP application No. 19199953.1, dated Feb. 11, 2020.

*Primary Examiner* — Muhammad Ijaz
(74) *Attorney, Agent, or Firm* — Locke Lord LLP; Scott D. Wofsy; Georgi Korobanov

(57) ABSTRACT

A mechanical hard stop for a sensor system includes a base for fixation to a gimbal or static structure, a movable stop member for engagement with a fixed stop member, and an actuator. The movable stop member has a disengaged position, proximate the base, and an engaged position, spaced apart from the base. The actuator is operably connected to the movable stop member to displace the movable stop member between the disengaged position and the engaged position according to a sensor selection received by the sensor system. Sensor systems and imaging methods are also described.

18 Claims, 7 Drawing Sheets

(56) References Cited

U.S. PATENT DOCUMENTS

2019/0215451 A1* 7/2019 Enke .................... F16M 11/123
2020/0096151 A1* 3/2020 Lange ................ F16M 11/2028
2020/0096153 A1* 3/2020 Lange .................. F16M 11/123

* cited by examiner

MECHANICAL HARD STOPS WITH MOVEABLE STOP MEMBERS

CROSS REFERENCE TO RELATED APPLICATIONS

This application claims priority to U.S. Provisional Patent Application Ser. No. 62/736,947 filed Sep. 26, 2018 the disclosures of each are herein incorporated by reference in their entirety.

BACKGROUND OF THE INVENTION

1. Field of the Invention

The present disclosure relates to sensor systems, and more particularly to mechanical hard stops with movable stop members for limiting gimbal rotation in sensor systems.

2. Description of Related Art

Sensing systems, such as those employing cameras, are commonly used to image scenes. During imaging the camera is generally oriented toward a scene to image the portion of the scene within the camera field of view. To increase the portion of a scene imaged cameras are typically fixed to a gimbal. The gimbal is generally rotatable with a finite rotation range. Movement through the rotation range sweeps the camera's field of view through the scene to define the camera's field of regard while accommodating constraints within sensor structure, such as cable runs between the camera and stationary structures in sensor system. Fixed stops are generally employed to prevent gimbal from rotating beyond the rotation range, such as from shock and accelerations during flight that otherwise could drive the gimbal beyond the rotation range.

One challenge with hard stops is that fixed mechanical hard stops can sometimes impose artificial constraints on the sensing system. For example, in sensing systems having more than one camera mounted to the gimbal with unequal fields of the view, the movement range defined by the fixed mechanical stop can limit the field of regard to less than what the camera(s) could otherwise provide. This unnecessarily limits the amount of information acquired during imaging.

Such conventional methods and systems have generally been considered satisfactory for their intended purpose. However, there is still a need in the art for improved mechanical hard stops for sensor systems, sensor systems with mechanical hard stops, and imaging methods using mechanically stopped sensor systems. The present disclosure provides a solution for this need.

SUMMARY OF THE INVENTION

A mechanical hard stop for a sensor system includes a base for fixation to a gimbal or static structure, a movable stop member for engagement with a fixed stop member, and an actuator. The movable stop member has a disengaged position, proximate the base, and an engaged position, spaced apart from the base. The actuator is operably connected to the movable stop member to displace the movable stop member between the disengaged position and the engaged position according to a sensor selection received by the sensor system.

In certain embodiments the actuator can include a solenoid to displace the movable stop member between the disengaged position and the engaged position. A biasing member can be connected between the base and the movable stop member. The biasing member can bias the movable stop member toward one of the disengaged position and the engaged position. The mechanical hard stop can conform in fit and form to a fixed stop member for a DB-100 sensor system.

In accordance with certain embodiments a controller can be connected to the actuator. The controller can be responsive to instructions recorded on a memory to displace, the movable stop member between the disengaged position and the engaged position. The instructions can cause the controller to receive a sensor selection and displace the movable stop member between the disengaged position and the engaged position according to the received sensor selection. For example, the instructions can cause the controller to displace the movable hard stop member radially to the disengaged position when a narrow field of view sensor carried by a gimbal is selected for imaging. It is also contemplated that the instructions can cause the controller to displace the movable hard stop member radially to the engaged position when a wide field of view sensor carried by a gimbal is selected for imaging.

A sensor system includes a gimbal and a mechanical hard stop as described above. The gimbal is supported for rotation about an axis relative to a static structure. The base of the mechanical hard stop is fixed relative to the static structure. The movable stop member limits rotation of the gimbal when in the engaged position. The movable stop member does not limit rotation of the gimbal in the disengaged position.

In certain embodiments cabling can connect a sensor carried by the gimbal to a controller fixed relative to the static structure. A fixed stop member can be carried by the gimbal. The fixed stop member can come in to circumferential abutment with the movable stop member when the movable stop member is in the engaged position. The mechanical hard stop can be a first mechanical hard stop and the sensor system can include a second mechanical hard stop as described above. The base of the second mechanical hard stop can be fixed to the static structure. The second mechanical hard stop can be offset from the first mechanical hard stop about the axis by 45 degrees or less.

In accordance with certain embodiments the sensor system can include a faring with a window. The faring can envelope the sensor system. The faring can be fixed to the static structure. The window can be a first window and the sensor system can include a second window. The second window can be supported by the faring and offset from the first window about the axis. A sensor can be carried by the gimbal. The sensor can have a field of view that is orthogonal relative to the axis. The sensor can be a first sensor and the sensor system can have a second sensor. The second sensor can be carried by the gimbal and arranged on a side of the axis opposite the first sensor.

It is contemplated that, in accordance with certain embodiments, the sensor system can include a resolver. The resolver can be arranged to determine rotational position of the gimbal about the axis. A drive motor can be operably connected to the gimbal. The drive motor can be configured to rotate the gimbal about the axis. The axis can be a roll axis. The axis can be a pitch axis. It is also contemplated that the sensor system can include first and second sensors carried by the gimbal, the first sensor having a field of view that is larger than a field of view of the second sensor, and a controller. The controller can be operatively connected to the actuator and disposed in communication with a memory having instructions recorded on it that, when read by the controller, cause the controller to receive a sensor selection, displace the movable, stop member to the engaged position using the actuator when the first sensor is selected, and displace the movable stop member to the disengaged position using the actuator when the second sensor is selected.

An imaging method includes, at a sensor system having mechanical hard stop as described above, receiving a sensor selection. When the first sensor is selected the movable stop member is displaced radially to the engaged position using the actuator. When the second sensor is selected the movable stop member is displaced radially to the disengaged position using the actuator. In certain embodiments, a scene is imaged with the first sensor when the movable stop member is in the engaged position. In accordance with certain embodiments, a scene can be imaged with the second sensor when the movable stop member is in the disengaged position.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
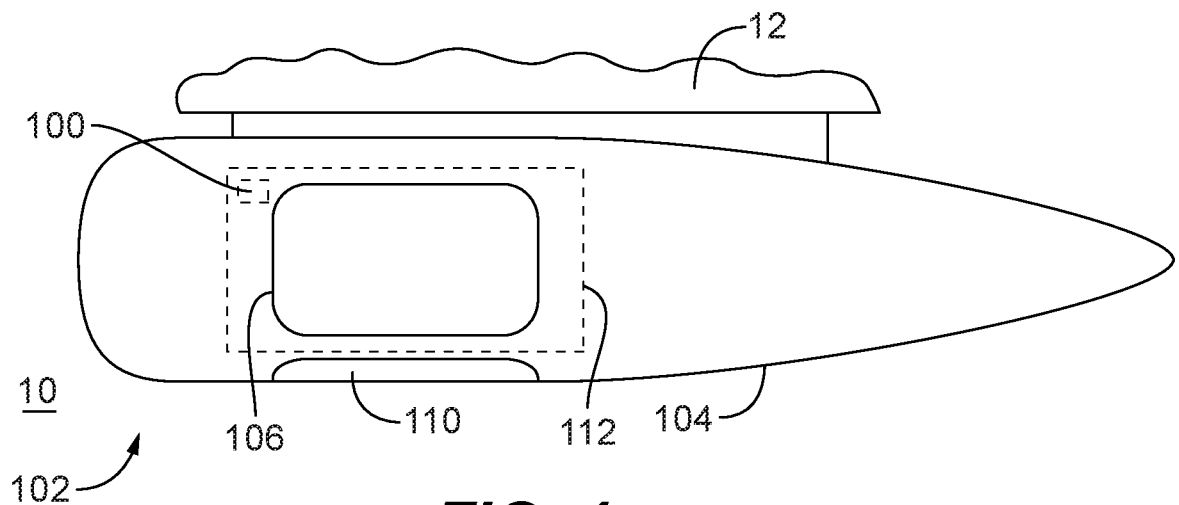
FIG. 1 is a side view of a sensor system, showing the sensor system enveloped within a faring having a window for imaging a scene outside the faring through the window.

Reference will now be made to the drawings wherein like reference numerals identify similar structural features or aspects of the subject disclosure. For purposes of explanation and illustration, and not limitation, a sensor system with a mechanical hard stop having a movable stop member is shown in FIG. 1 and is designated generally by reference character 102. Other embodiments of mechanical hard stops, sensor systems having mechanical hard stops with movable stop members, and imaging methods are shown in FIGS. 2-15, as will be described. The systems and methods described herein can be used in intelligence surveillance and reconnaissance (ISR) sensor systems, such as in sensor systems having more than one sensor mounted on a common gimbal, though the present disclosure is not limited to sensor systems having more than one sensor or to ISR systems in general.

Referring to FIG. 1, sensor system 102 is shown. Sensor system 102 is enveloped within the interior of a faring 104. Faring 104 includes a window 106 which provides a viewing area for data collection from a scene 10 located outside of faring 104. In the illustrated exemplary embodiment window 106 is a first window and faring 104 includes at least one second window, e.g., a second window 108 (shown in FIG. 11) and a third window 110. It is contemplated that sensor system 102 be arranged as an ISR sensor system, such as an ISR system carried by an aircraft 12. Examples of suitable ISR sensor systems include dual-band ISR sensor systems, such as DB-110 sensor systems, available United Technologies Aerospace Systems of Charlotte, N.C. In certain embodiments mechanical hard stop 100 conforms in fit and form to a fixed stop member for a DB-110 sensor system, facilitating integration of mechanical hard stop 100 into DB-110 sensor systems.

Figure 2:
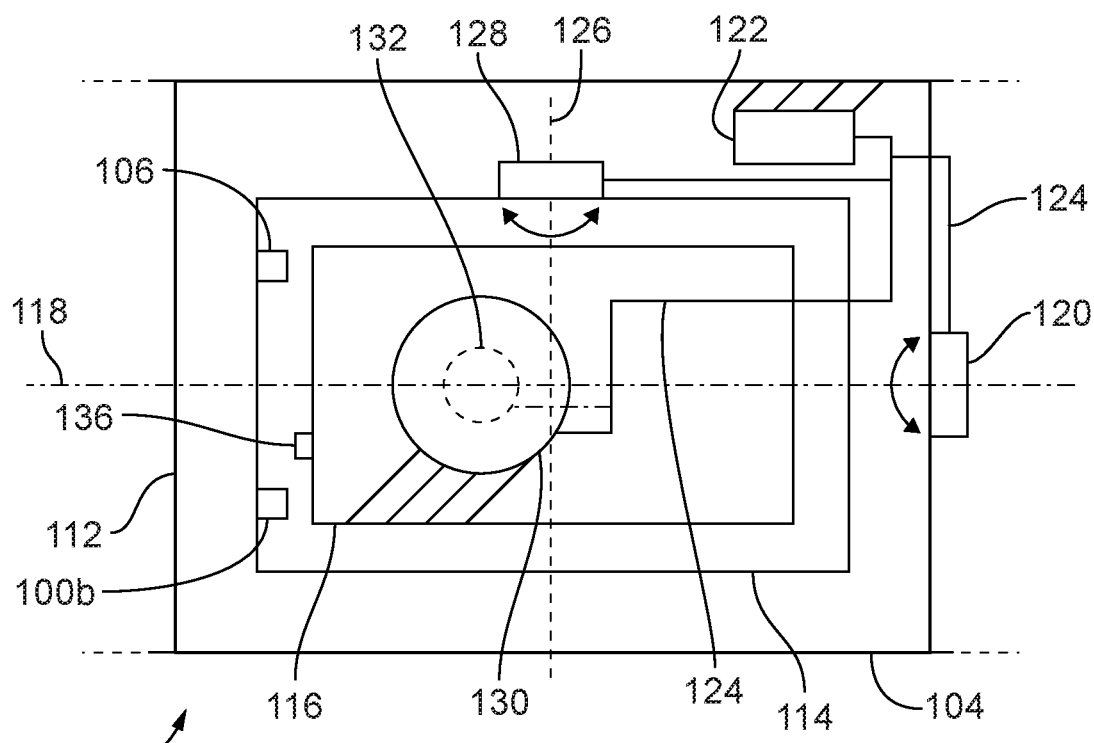
FIG. 2 is a side elevation view of the sensor system of FIG. 1, schematically showing first and second sensors carried by a gimbal of the sensor system.

With reference to FIG. 2, sensor system 102 is shown. Sensor system 102 includes a static structure 112, a roll gimbal 114, and pitch gimbal 116. Faring 104 is fixed relative to static structure 112 and is supported thereby. Roll gimbal 114 is connected to static structure 112 and is supported thereby for rotation about a roll axis 118. Rotation of roll gimbal 114 about roll axis 118 is effected by a roll resolver/drive arrangement 120, which is operably connected to roll gimbal 114 for rotating roll gimbal 114 about roll axis 118. As shown in FIG. 2 a controller 122 is disposed in communication with roll resolver/drive arrangement 120 through cabling 124, through which controller 122 controls rotation of roll gimbal 114 about roll axis 118.

Pitch gimbal 116 is connected to roll gimbal 114 and is supported thereby for rotation about a pitch axis 126. Rotation of pitch gimbal 116 about pitch axis 126 is effected by a pitch resolver/drive arrangement 128, which is operably connected to pitch gimbal 116 for rotating pitch gimbal 116 about pitch axis 126 and which is itself carried by roll gimbal 114. As also shown in FIG. 2 controller 122 is disposed in communication with pitch resolver/drive arrangement 126 through cabling 124, through which controller 122 also controls rotation of pitch gimbal 116 about pitch axis 126.

Pitch gimbal 116, and therethrough roll gimbal 114, carry a first sensor 130 and a second sensor 132. Second sensor 132 is arranged on a side of roll axis 118 opposite first sensor 130, either (or both) first sensor 130 and second sensor 132 being disposed in communication with controller 122 for receiving data from either (or both) first sensor 130 and second sensor 132. Data from first sensor 130 and second sensor 132 is provided through cabling 124, which provides connectivity for digital data communication between the sensors and controller 122.

Controller 122 is fixed relative to static structure 112. Since cabling 124 runs between movable structures, e.g., pitch resolver/drive arrangement 128, first sensor 130, and second sensor 132, it is necessary to limit the movement of one or more of the movable structures relative to static structure 112. This prevents damage on cabling 124 that could otherwise occur from rotation of roll gimbal 114. Limitation of movement of roll gimbal 114 is effected by mechanical hard stop 100. As will be appreciated by those of skill in the art in view of the present disclosure, the disadvantages otherwise associated with having to manage cabling 124 can be offset by the advantages provided by the quality of the data communication connection provided by cabling 124, which allows first sensor 130 and second sensor 132 to communicate image data with the data loss that could otherwise accompany the use of a slip ring or other type of data communication interface.

In the illustrated exemplary embodiment and as described herein mechanical hard stop 100 is a first mechanical hard stop 100a and limitation of movement of roll gimbal 114 is effected by cooperation of first mechanical hard stop 100a with one or more of a second mechanical hard stop 100b and a fixed stop member 136. Although a particular mechanical hard stop arrangement is shown, e.g., mechanical hard stops with moveable stop members connected to static structure and a fixed stop member connected to a gimbal, it is to be understood and appreciated that other arrangements are possible within the scope of the present disclosure. For example, mechanical hard stops with movable stop members can be carried by the gimbal and a fixed stop member attached to the static structure. Further, pitch gimbal 14 can also be stopped using a mechanical stop with movable stop/fixed stop member arrangement, as suitable for an intended application.

Figure 3:
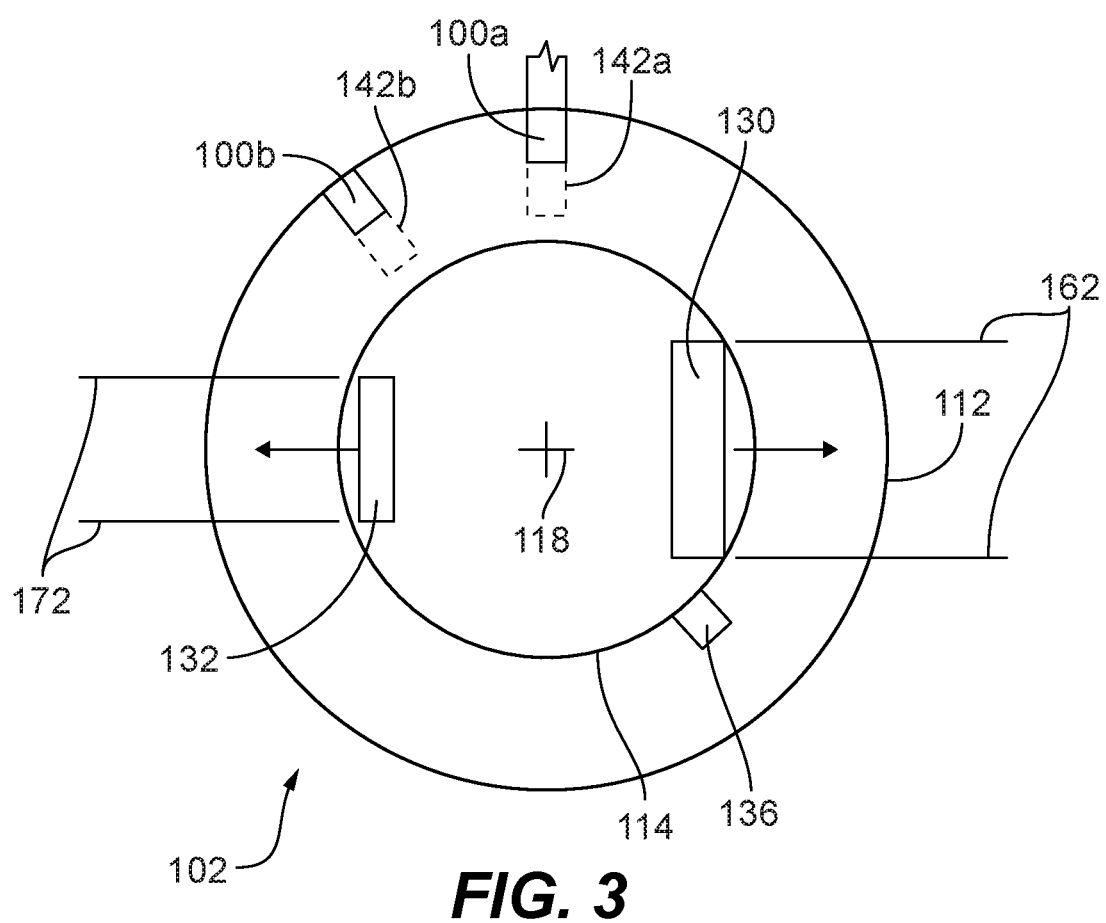
FIG. 3 is an axial end view of the sensor system of FIG. 1, schematically showing mechanical hard stops with movable stop members and a fixed stop member to define different rotation movement ranges of the gimbal.

With reference to FIG. 3, sensor system 102 is shown in an axial end view. As shown in FIG. 3 roll gimbal 114 extends about roll axis 118 and carries first sensor 130 and second sensor 132. Static structure 112 extends about roll gimbal 114 and is located radially outward of roll gimbal 114. Second sensor 132 is arranged on a side of roll axis 118 opposite first sensor 130 and has a second sensor field of 172. Second sensor field of view 172 is smaller than a field of view 162 of first sensor 130. In certain embodiments first sensor 130 can be a wide field of view sensor, such as optical waveband sensor. Examples of optical waveband sensors include cameras and telescopes. In accordance with certain embodiments second sensor 132 can be a narrow field of view sensor, such as an infrared waveband sensor. Examples of infrared sensors include infrared sub-waveband imaging arrays.

Fixed stop member 136 is carried by roll gimbal 114. In this respect fixed stop member 136 is fixed relative to roll gimbal 114 and is located at singular radial position from roll axis 118 irrespective of which sensor carried by roll gimbal 114 is used for imaging. As will be appreciated by those of skill in the art in view of the present disclosure, fixation in to roll gimbal 114 allows fixed stop member 116 to come into circumferential abutment with first movable stop member 138a when in engaged position 142a or second movable stop member 138b when in engaged position 142b, thereby preventing further rotation of roll gimbal 114.

First mechanical hard stop 100a and second mechanical hard stop 100b are each fixed relative to static structure 112. This means that both first mechanical hard stop 100a and second mechanical hard stop 100b are arranged at fixed circumferential positions relative to one another and in relation to fixed stop member 136, which is carried by roll gimbal 114 and movable relative to first mechanical hard stop 100a and second mechanical hard stop 100b. In the illustrated exemplary embodiment second mechanical hard stop 100b is circumferentially offset from first mechanical hard stop 100a by an angular offset that is less than about 45 degrees. Angular offsets of about 45 degrees allows for cooperation of first mechanical hard stop 100a and second mechanical hard stop 100b such that the field of view of each first sensor 130 and second sensor 132 can be swept across the entirety of both first window 106 (shown in FIG. 1) and second window 108 (shown in FIG. 4), data collection thereby being limited by the boundaries defined by first window 130 and second window 132 and not engagement of one fixed stop member with another fixed stop member.

Instead, first mechanical hard stop 100a has a movable stop member 138a. Movable stop member 138a is movable radially, e.g., toward and away from roll axis 118, between an engaged position 142a (shown in dashed outline) and a disengaged position 140a (shown in solid outline). In the disengaged position 140a movable stop member 138a does not impede the rotation of roll gimbal 114 as fixed stop member 136 passes. As will be appreciated by those of skill in the art in view of the present disclosure, this allows roll gimbal 114 to rotate past first mechanical hard stop 100a without limitation by first mechanical hard stop 100a. In contrast, when in the engaged position 142a, movable stop member 138a moves radially inward toward roll gimbal 114 such that fixed stop member 136 cannot rotate past first mechanical hard stop 100a, first mechanical hard stop 100a thereby limiting rotation of roll gimbal 114. Second mechanical hard stop 100b is similar to first mechanical hard stop 100a with the difference that second mechanical hard stop 100b is rotationally offset from first mechanical hard stop 100a about roll axis 118. As will be appreciated by those of skill in the art in view of the present disclosure, this allows second mechanical hard stop 100b to limit rotation of roll gimbal 114 to a within a different rotational range than first mechanical hard stop 100a according to the position of a second movable stop member 138b of second mechanical hard stop 100b.

Figure 4:
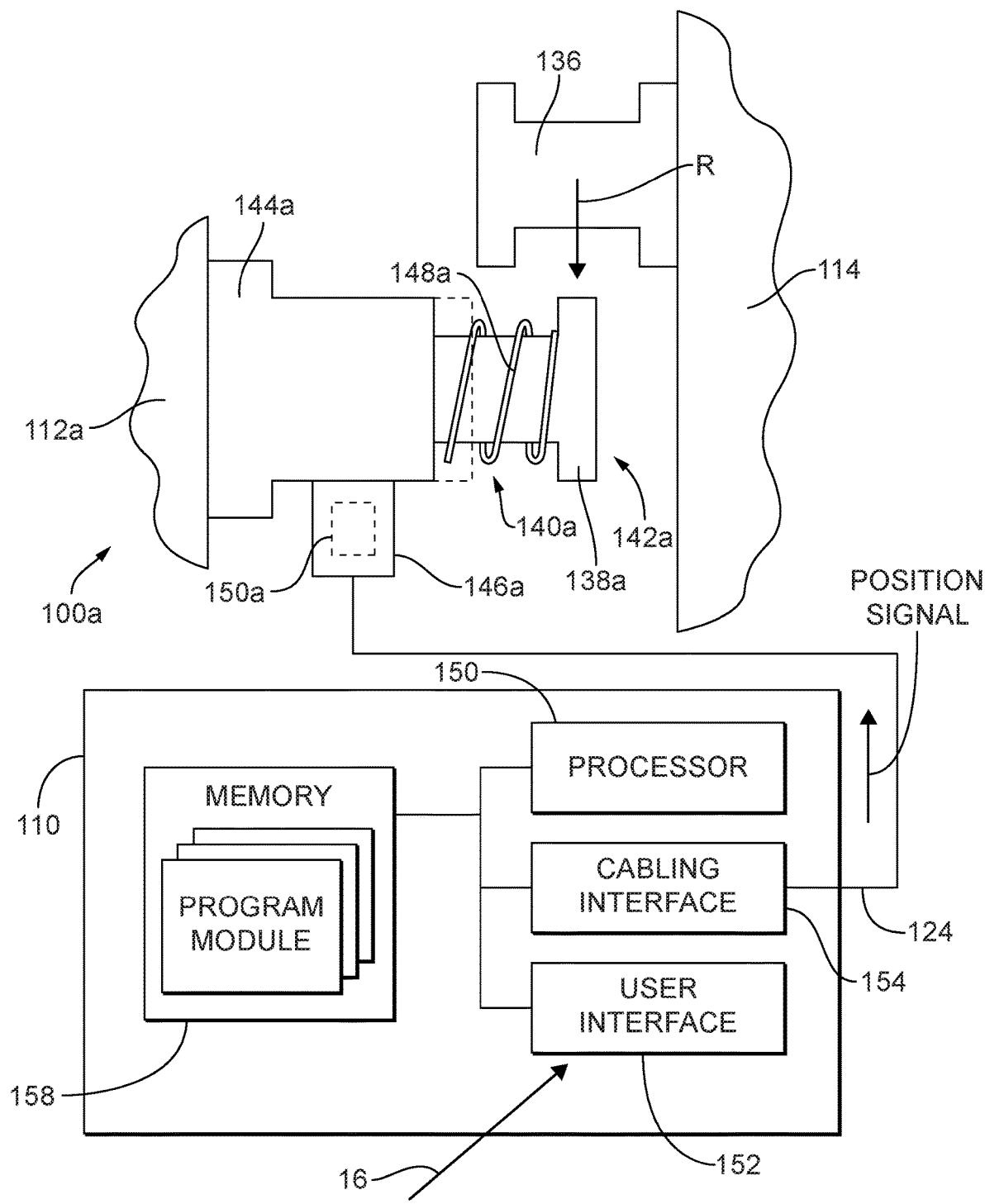
FIG. 4 is a side view of the movable stop member and a fixed stop member of the sensor system of FIG. 1, showing a controller operatively connected to the mechanical hard stop and disengaged and engaged positions of the mechanical hard stop movable stop member.
Figure 5:
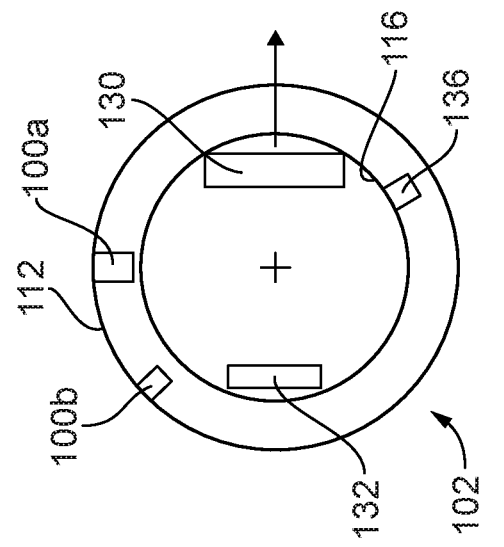
FIGS. 5-7, 11 and 12 are axial end views of the sensor system of FIG. 1, showing a rotational movement range and field of regard of a first sensor when movable stop members of a mechanical hard stops are in the engaged and disengaged positions, respectively.

With reference to FIG. 4, first mechanical hard stop 100a is shown. First mechanical hard stop 100a includes a base 144a for fixation to roll gimbal 114 or static structure 112, movable stop member 138a for engagement with fixed stop member 136, and an actuator 146a. Moveable stop member 138a has disengaged position 140a, which is proximate to base 144a, and engaged position 142a, which is spaced apart from base 144a. Actuator 146a is operably connected to movable stop member 138a to displace movable stop member 138a between disengaged position 140a and engaged position 142a according to a sensor selection 16 received by sensor system 102 (shown in FIG. 1).

First mechanical hard stop 100a includes a biasing member 148a. Biasing member 148a is arranged between base 144a and movable stop member 138a and is arranged to bias movable stop member 138a toward one of engaged position 142a and disengaged position 140a. As shown in FIG. 4, actuator 146a includes a solenoid 150a to effect movement of movable stop member 138a between engaged position 142a and disengaged position 140a. As will be appreciated by those of skill in the art in view of the present disclosure, actuator 146a can alternatively include other types of motive devices to effect movement of movable stop member 138a between engaged position 142a and disengaged position 140a, such as electric motors with and without gearing, pneumatics, and/or hydraulics, and remain within the scope of the present disclosure.

As also shown in FIG. 4, controller 122 is connected to first mechanical hard stop 100a. Controller 122 includes a processor 150, a user interface 152, and a cabling interface 154. Cabling interface 154 is disposed in communication with actuator 146a through cabling 124, which connects controller 122 to actuator 146a, and is additionally disposed in communication with processor 152. Processor 152 is in turn communicative with user interface 152 and a memory 156 having a plurality of program modules 158 recorded thereon with instructions that, when ready by processor 152 cause processor to execute certain operations.

For example, responsive to the instructions recorded on memory 156, controller 122 can displace movable stop member 138a between disengaged position 140a and engaged position 142a. Further, instructions can cause controller 122 to receive sensor selection 16 and, based on the sensor identified with sensor selection 16, displace movable stop member 138a between disengaged position 140a and engaged position 142a according to received sensor selection 16. In certain embodiments the instructions cause controller 122 to displace movable stop member 138a to disengaged position 140a when second sensor 132 carried by roll gimbal 114 is selected for imaging. In accordance with certain embodiments, the instructions can cause controller 122 to displace movable stop member 138a to engaged position 142a when first sensor 130 carried by roll gimbal 114 is selected for imaging. It is contemplated that the displacement of movable stop member 138a be incorporated in an imaging method, e.g., an imaging method 200 (shown in FIG. 15), as will be described. Second mechanical hard stop 100b is similar to first mechanical hard stop 100a and is additionally located on static structure 112 at a location rotationally offset from first mechanical hard stop 100a.

With reference to FIGS. 5-9, a rotational ranges of first sensor 130 is shown. When first sensor 130 is selected for imaging it is contemplated that controller 122 configure first mechanical hard stop 100a and second mechanical hard stop 100b such that the field of regard of first sensor 130 is limited by the edges of first window 106 (shown in FIG. 8) and second window 108 (shown in FIG. 9) rather than the location of fixed stop member 136 in sensor system 102. Controller 122 therefore actuates second mechanical stop 100b such that second movable stop member 138b (shown in FIG. 4) displaces to disengaged position 140b (shown in FIG. 4). Controller 122 also actuates first mechanical hard stop 100a such that movable stop member 138a (shown in FIG. 4) displaces to engaged position. 142a (shown in FIG. 4). This causes first mechanical hard stop 100a to determine the rotational limits of roll gimbal 114 about roll axis 118.

Figure 6:
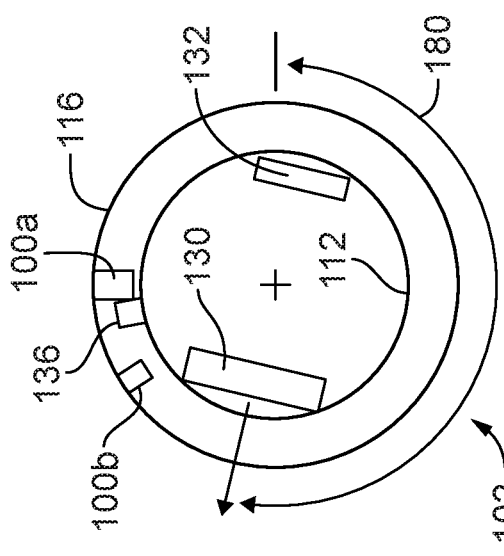
Figure 7:
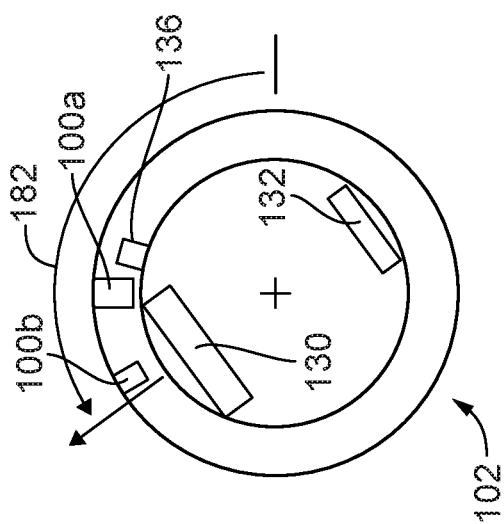
Figure 8:
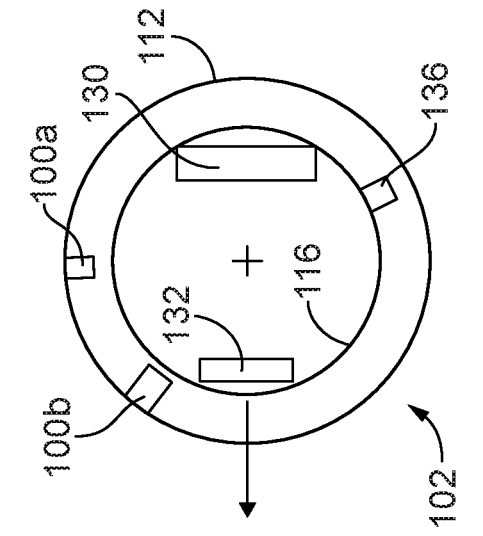
FIGS. 8-10, 13 and 14 are axial end views of the sensor system of FIG. 1, showing a rotational movement range and field of regard of a second sensor when movable stop members of a mechanical hard stops are in the disengaged and engaged positions, respectively.
Figure 9:
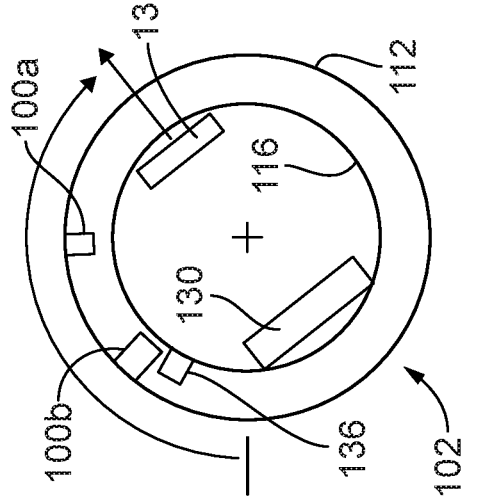
Figure 10:
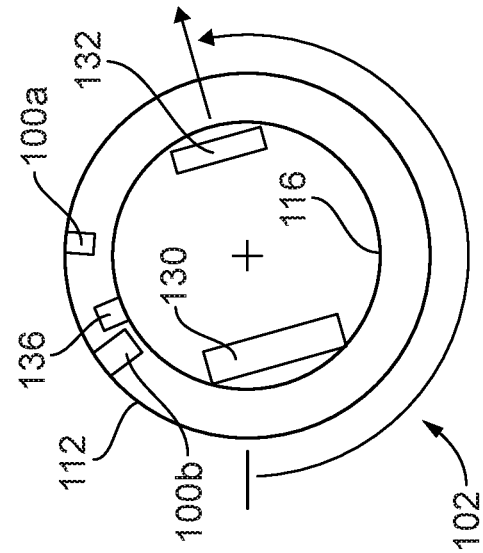

Movement of second movable stop member 138b to disengaged position 140b allows roll resolver/drive arrangement 120 to rotate roll gimbal 114 about roll axis 118 such that fixed stop member 136 is able to rotate past second movable stop member 138b, the rotary movement of roll gimbal 114 continuing until fixed stop member 136 comes into abutment with first movable stop member 138a. Once fixed stop member 136 comes into abutment with first movable stop member 138a rotation of roll gimbal 114 ceases. As shown in FIGS. 6 and 7, relative to the port side horizon during level flight of aircraft 10 (shown in FIG. 1), the positioning of first movable stop member 138a and second movable stop member 138b shown in FIG. 5 allow roll gimbal 114 to rotate clockwise in a rotary movement 180 of about 210 degrees, as shown in FIG. 6, and counterclockwise in a rotary movement 182 of about 150 degrees, as shown in FIG. 7. As shown in FIGS. 8 and 9, this allows the field of view of first sensor 130 to completely overlap both first window 106 and second window 108, the field of regard of first sensor 130 thereby limited by the uppermost (relative to the top of FIG. 9) edges of first window 106 and second window 108.

Referring to FIGS. 10-14, a rotational range 150b of second sensor 132 is shown. When second sensor 132 is selected for imaging it is contemplated that controller 122 configure first mechanical hard stop 100a and second mechanical hard stop 100b such that the field of regard of second sensor 132 is also limited by the edges of first window 106 (shown in FIG. 8) and second window 108 (shown in FIG. 9) rather than the location of fixed stop member 136. Controller 122 therefore actuates second mechanical hard stop 100b such that second movable stop member 138b moves to engaged position 142b and first mechanical hard stop 100a such that first movable stop member 138a moves to disengaged position 140a. This causes second mechanical hard stop 100b to determine the rotational limits of roll gimbal 114 about roll axis 118.

Figure 12:
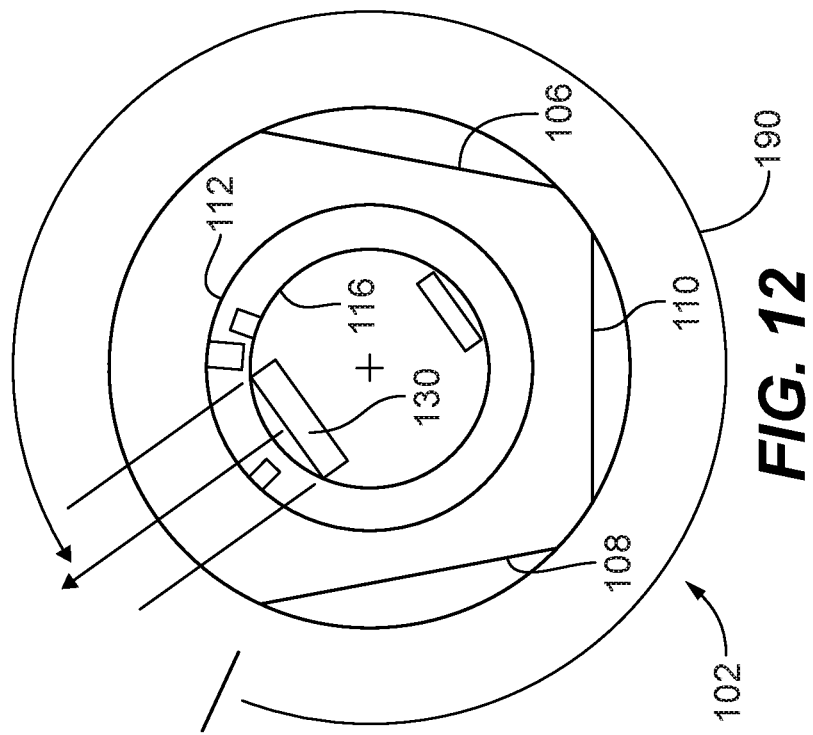
Figure 11:
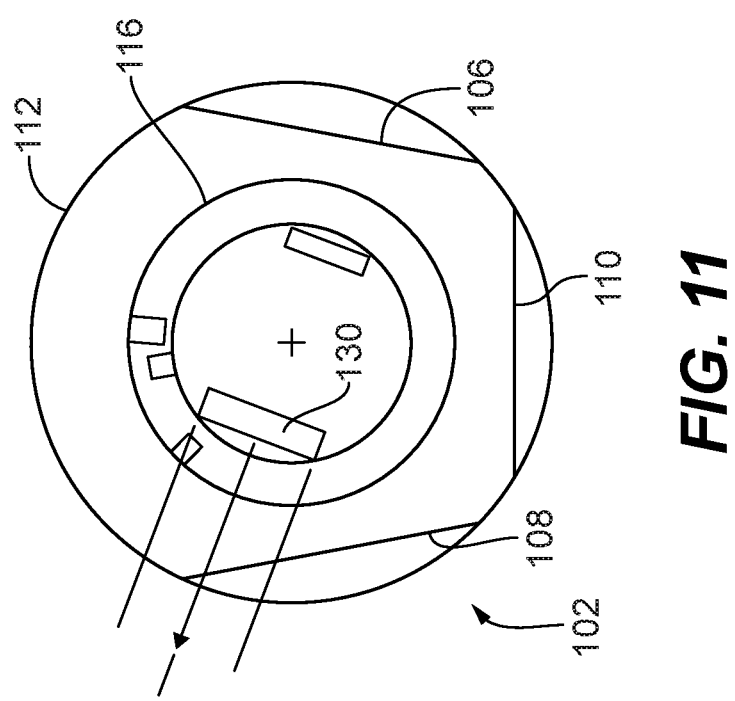
Figure 14:
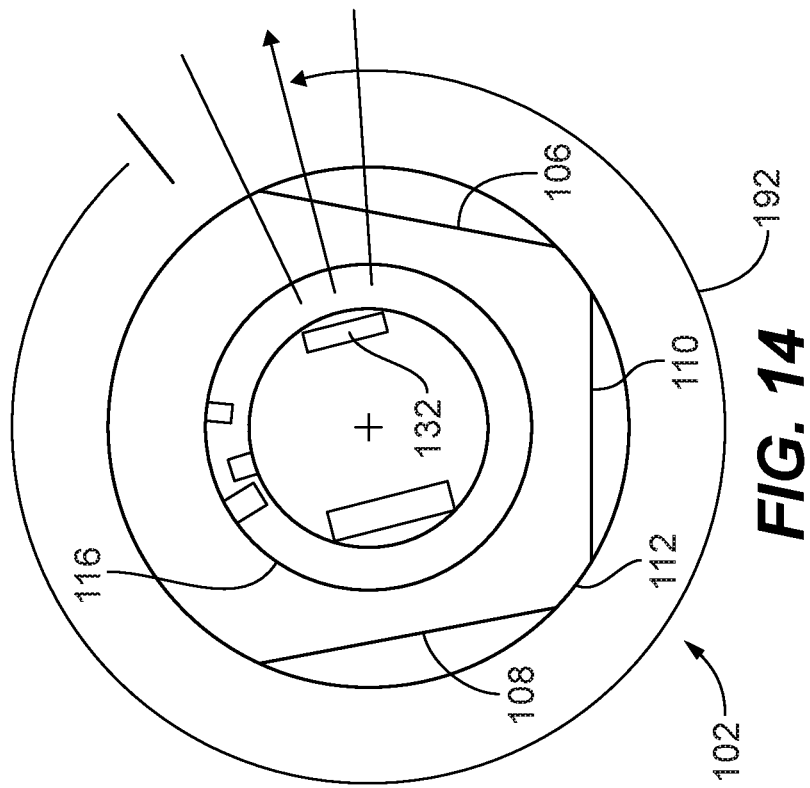
Figure 13:
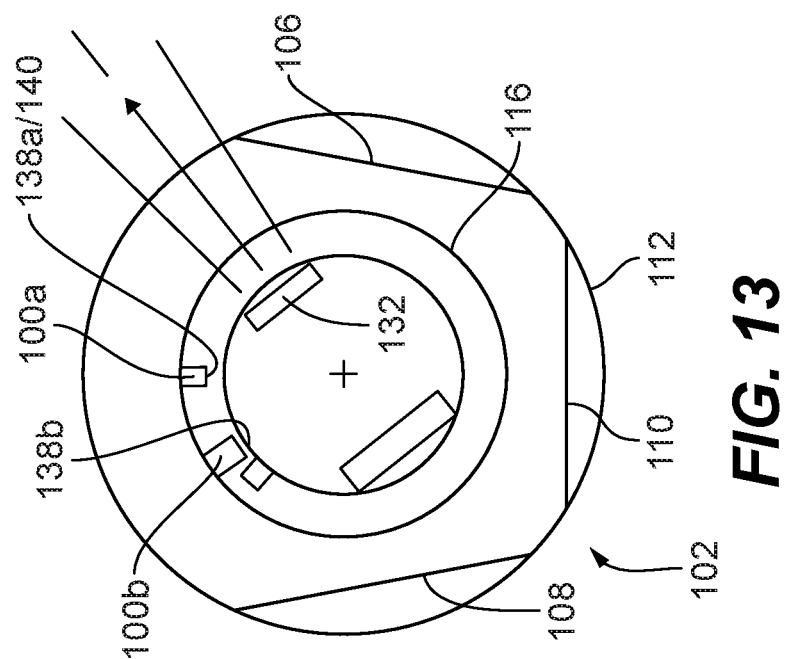

Movement of first movable stop member 138a to disengaged position 140a allows roll resolver/drive arrangement 120 to rotate roll gimbal 114 about roll axis 118 such that fixed stop member 136 is able to rotate past first movable stop member 138a, rotary movement of roll gimbal 114 continuing until fixed stop member 136 comes into abutment with second movable stop member 138b. Once fixed stop member 136 comes into abutment with second movable stop member 138b rotation of roll gimbal 114 ceases. As shown in FIGS. 11 and 12, relative to the port side horizon during level flight of aircraft 10, the positioning of first movable stop member 138a and second movable stop member 138b shown in FIG. 10 allow roll gimbal 114 to rotate clockwise in a rotary movement of about 150 degrees, as shown in FIG. 11 and counterclockwise in a rotary movement of about 275 degrees, as shown in FIG. 12. As shown in FIGS. 13 and 14, this allows the field of view of second sensor 132 to completely overlap both first window 106 and second window 108, the field of regard of second sensor 13 maximized as limited by the edges of first window 106 and second window 108. Notably, first sensor movement 190 (shown in FIG. 12) and second sensor movement 192 (shown in FIG. 14) each start and terminate at different rotational positions according to the positions of first movable stop member 138a and second movable stop member 138b.

Figure 15:
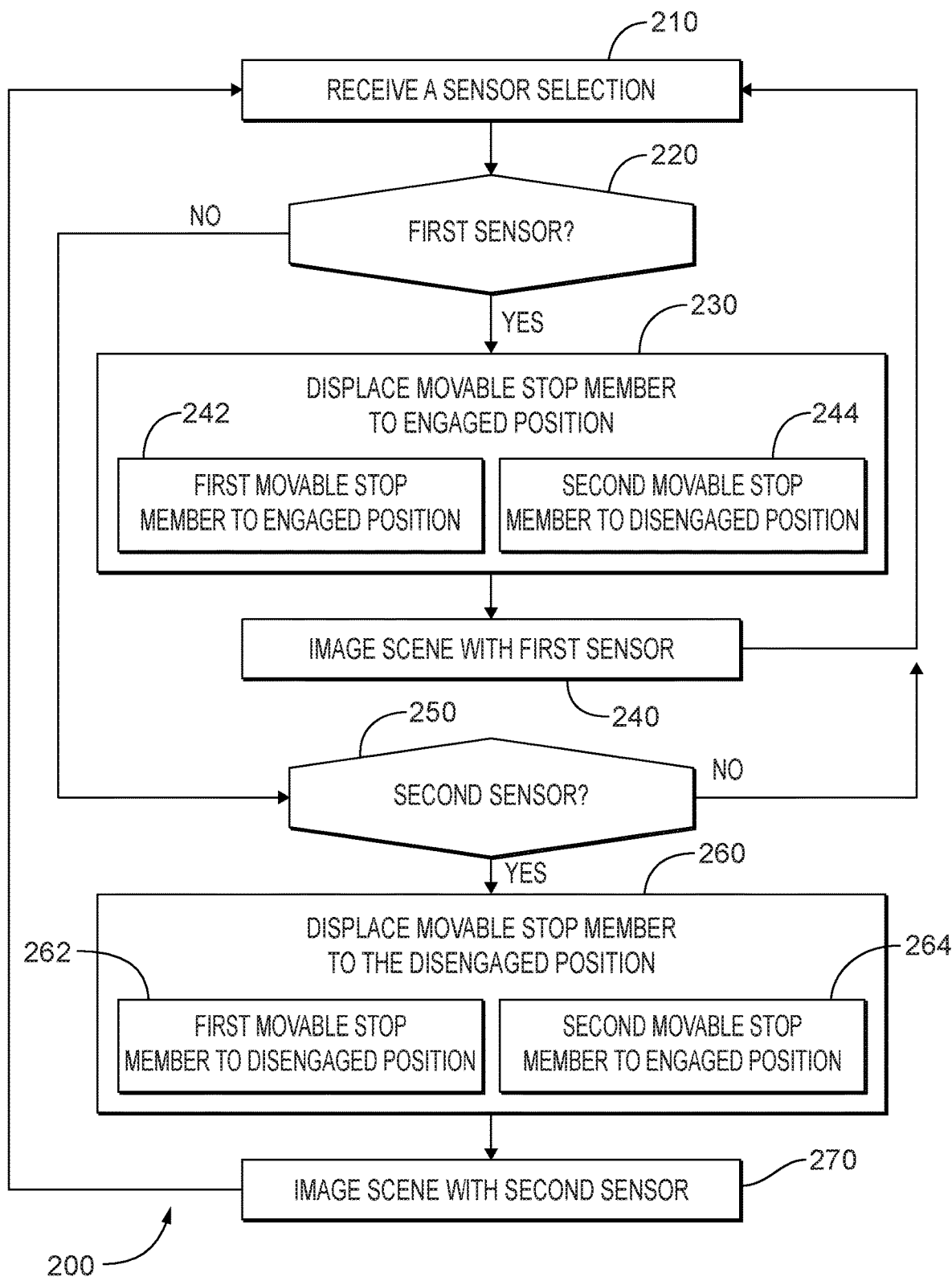
FIG. 15 is a block diagram of an imaging method, showing steps of the imaging method according to an exemplary embodiment.

With reference to FIG. 15, an imaging method 200 is shown. Imaging method 200 includes receiving a sensor selection, e.g., sensor selection 16 (shown in FIG. 3), as shown with box 210. When a first sensor is selected, e.g., first sensor 130 (shown in FIG. 2), a movable stop member is moved to the engaged position, as shown by boxes 220 and 230. A scene, e.g., scene 12 (shown in FIG. 1), is then imaged using the first sensor by rotating the first sensor to define a first sensor field of regards bounded by windows of the imaging system, e.g., first window 106 (shown in FIG. 3) and second window 108 (shown in FIG. 3), as shown with box 240. In this respect a first movable, stop member, e.g., first movable stop member 138a (shown in FIG. 3), is moved to the engaged position, as shown with box 232. It is contemplated that a second movable stop member, e.g., second movable stop member 138b (shown in FIG. 13), can be moved to the disengaged position, e.g., disengaged position 140b (shown in FIG. 13), as shown with box 234.

When a second sensor is selected, second sensor 132 (shown in FIG. 2), the movable stop member can be displaced to the disengaged position, e.g., disengaged position 140a (shown in FIG. 3), as shown with box 250 and box 260. The scene is then imaged using the second sensor by rotating the second sensor to define a second sensor field of regards bounded by windows, as shown with box 270. When the second sensor is selected it is contemplated that the first movable sensor be moved to the disengaged position, e.g., disengaged position 140*a* (shown in FIG. 3), and that the second movable stop member be moved to an engaged position, e.g., engaged position 142*b* (shown in FIG. 14), as shown with box 262 and box 264.

The methods and systems of the present disclosure, as described above and shown in the drawings, provide for sensor systems with superior properties including the capability to adjust the rotational movement range of a gimbal. In certain embodiments the capability to adjust the movement range allows changing the rotational movement range of the gimbal according to a sensor selection, allowing the field of regard of the selected sensor to be limited by the sensor window instead by a fixed stop member, expanding the field of regard of the sensor. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A mechanical hard stop for a sensor system, comprising:
   a sensor;
   a base configured for fixation to a gimbal or static structure;
   a movable stop member configured for engagement with a fixed stop member, the movable stop member having a disengaged position, proximate the base, and an engaged position, spaced apart from the base;
   an actuator operably connected to the movable stop member and configured to displace the movable stop member between the disengaged position and the engaged position according to a sensor selection received by the sensor system; and
   a controller connected to the actuator and responsive to instructions recorded on a memory to displace the movable stop member between the disengaged position and the engaged position.

2. The mechanical hard stop as recited in claim 1, wherein the actuator includes a solenoid to displace the movable stop member between the disengaged position and the engaged position.

3. The mechanical hard stop as recited in claim 1, further comprising a biasing member connected between the base and the movable stop member, the biasing member biasing the movable stop member toward one of the disengaged position and the engaged position.

4. The mechanical hard stop as recited in claim 1, wherein the mechanical hard stop conforms in fit and form to a fixed stop member for a DB-100 sensor system.

5. The mechanical hard stop as recited in claim 1, wherein the instructions recorded on the memory further cause the controller to:
   receive a sensor selection; and
   displace the movable stop member between the disengaged position and the engaged position according to the received sensor selection.

6. The mechanical hard stop as recited in claim 1, wherein the instructions recorded on the memory cause the controller to displace the movable stop member radially to the disengaged position when a narrow field of view sensor carried by the gimbal is selected for imaging.

7. The mechanical hard stop as recited in claim 1, wherein the instructions recorded on the memory cause the controller to displace the movable stop member radially to the engaged position when a wide field of view sensor carried by the gimbal is selected for imaging.

8. A sensor system, comprising:
   a gimbal supported for rotation about an axis relative to a static structure;
   a sensor;
   a base;
   a movable stop member configured for engagement with a fixed stop member, the movable stop member having a disengaged position, proximate the base, and an engaged position, spaced apart from the base; and
   an actuator operably connected to the movable stop member and configured to displace the movable stop member between the disengaged position and the engaged position according to a sensor selection received by the sensor system; and
   a controller connected to the actuator and responsive to instructions recorded on a memory to displace the movable stop member between the disengaged position and the engaged position
   wherein the base of the mechanical hard stop is fixed to the static structure, wherein the movable stop member limits rotation of the gimbal in the engaged position, wherein the movable stop member does not limit rotation of the gimbal in the disengaged position.

9. The sensor system as recited in claim 8, further comprising the fixed stop member carried by the gimbal and circumferentially overlapped by the movable stop member.

10. The sensor system as recited in claim 8, wherein the mechanical hard stop is a first mechanical hard stop and further including a second mechanical hard stop, wherein the base of the second mechanical is connected to the static structure.

11. The sensor system as recited in claim 10, wherein the second mechanical hard stop is offset from the first mechanical hard stop about the axis by 45 degrees or less.

12. The sensor system as recited in claim 8, further comprising a faring with a window enveloping the sensor system, the faring fixed to the static structure.

13. The sensor system as recited in claim 12, wherein the window is a first window and further comprising a second window, the second window supported by the faring and offset from the first window about the axis.

14. The sensor system as recited in claim 8, further comprising a sensor carried by the gimbal, wherein a field of view of the sensor is orthogonal relative to the axis.

15. The sensor system as recited in claim 14, wherein the sensor is a first sensor and further comprising a second sensor, wherein the second sensor is carried by the gimbal, wherein the second sensor is arranged on a side of the axis opposite the first sensor.

16. The sensor system as recited in claim 8, further comprising cabling connecting the sensor carried by the gimbal and the controller fixed relative to the static structure.

17. The sensor system as recited in claim 8, further comprising a resolver/drive arrangement operably connected to the gimbal and configured to rotate the gimbal about the axis.

18. The sensor system as recited in claim 8, further comprising:
   first and second sensors carried by the gimbal, the first sensor having a field of view that is larger than a field of view of the second sensor; and
   the controller operatively connected to the actuator and disposed in communication with a memory having instructions recorded on it that cause the controller to:

receive a sensor selection;
displace the movable stop member to the engaged position using the actuator when the first sensor is selected; and
displace the movable stop member to the disengaged position using the actuator when the second sensor is selected.

\* \* \* \* \*